Figure 1:
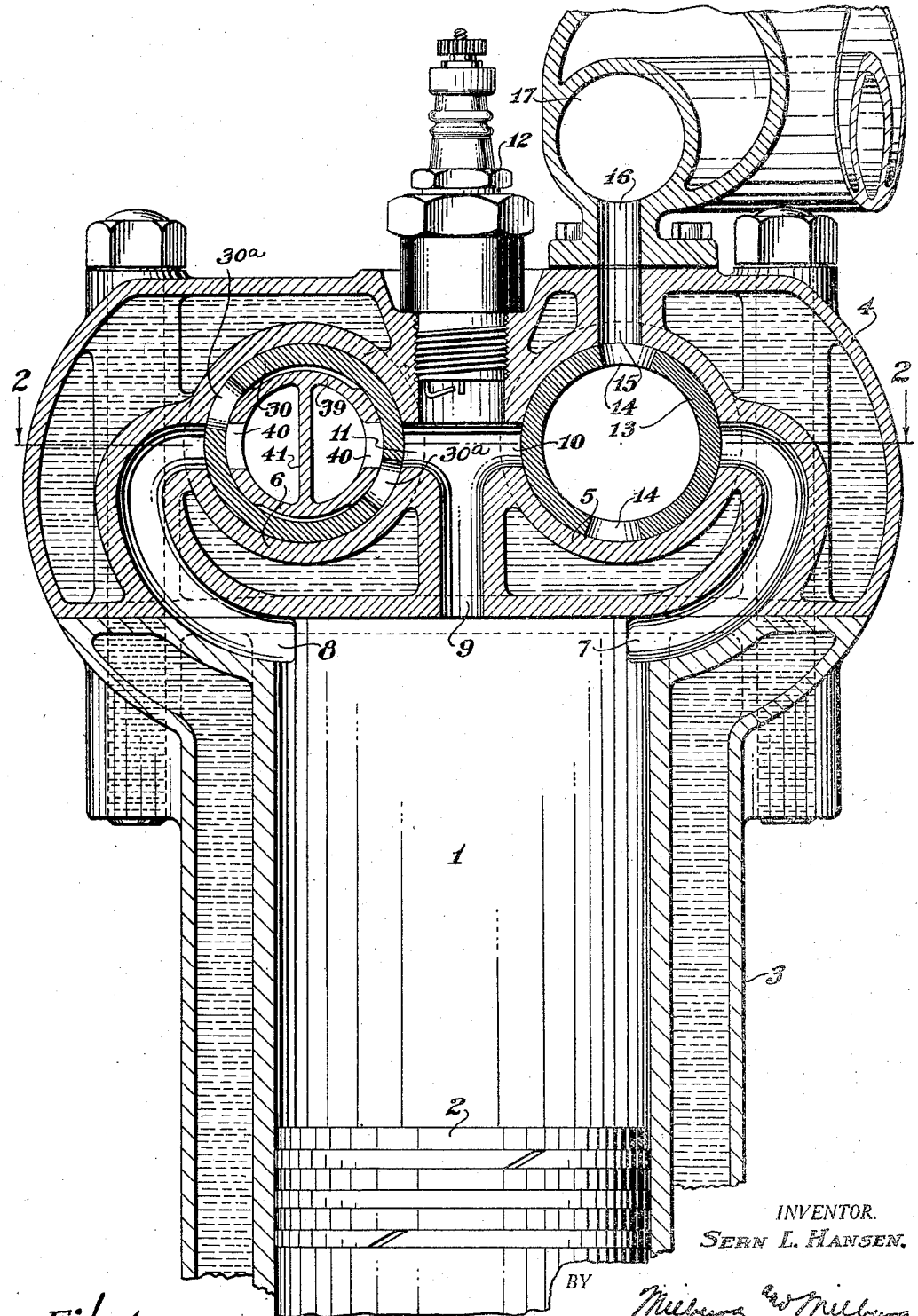

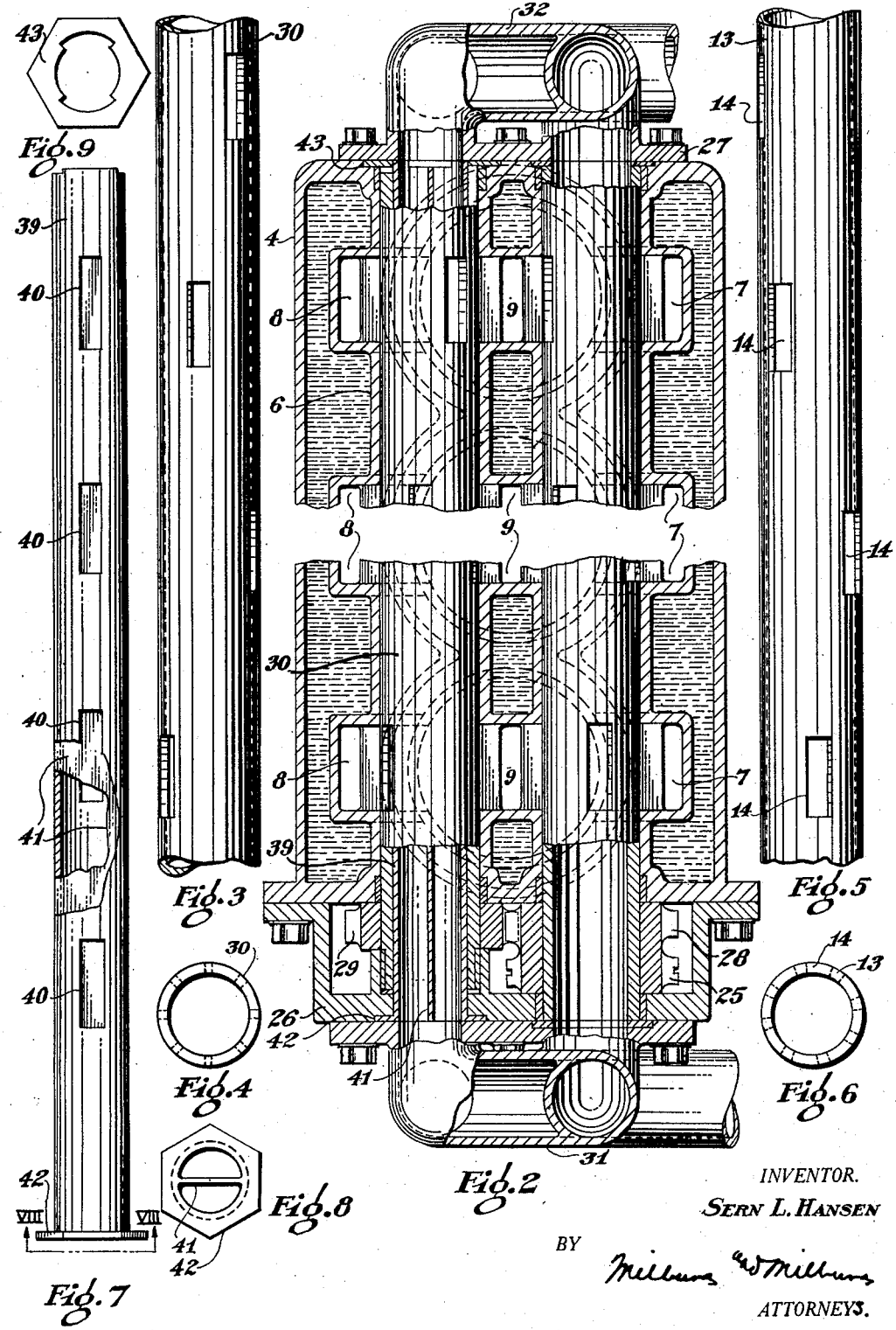

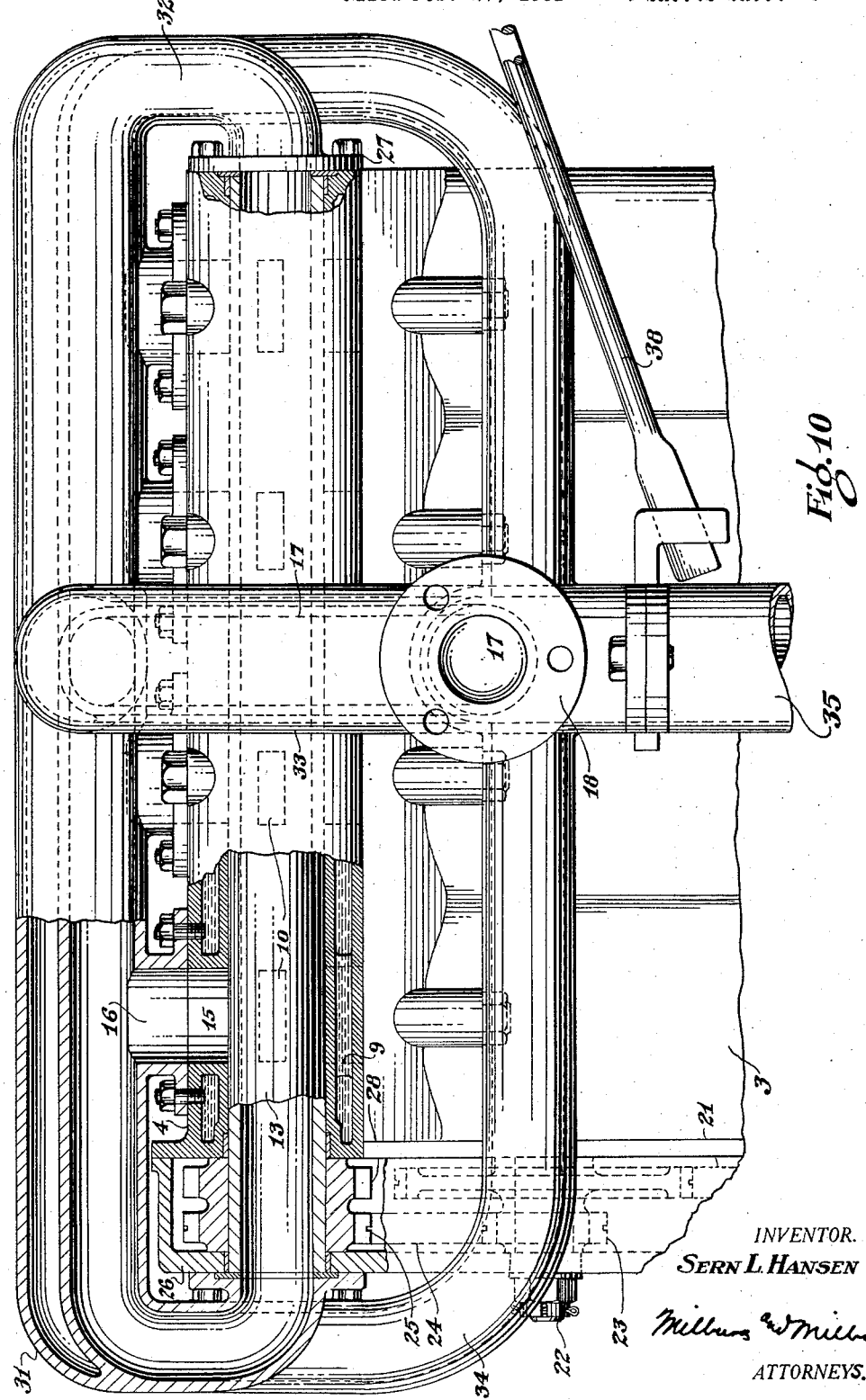

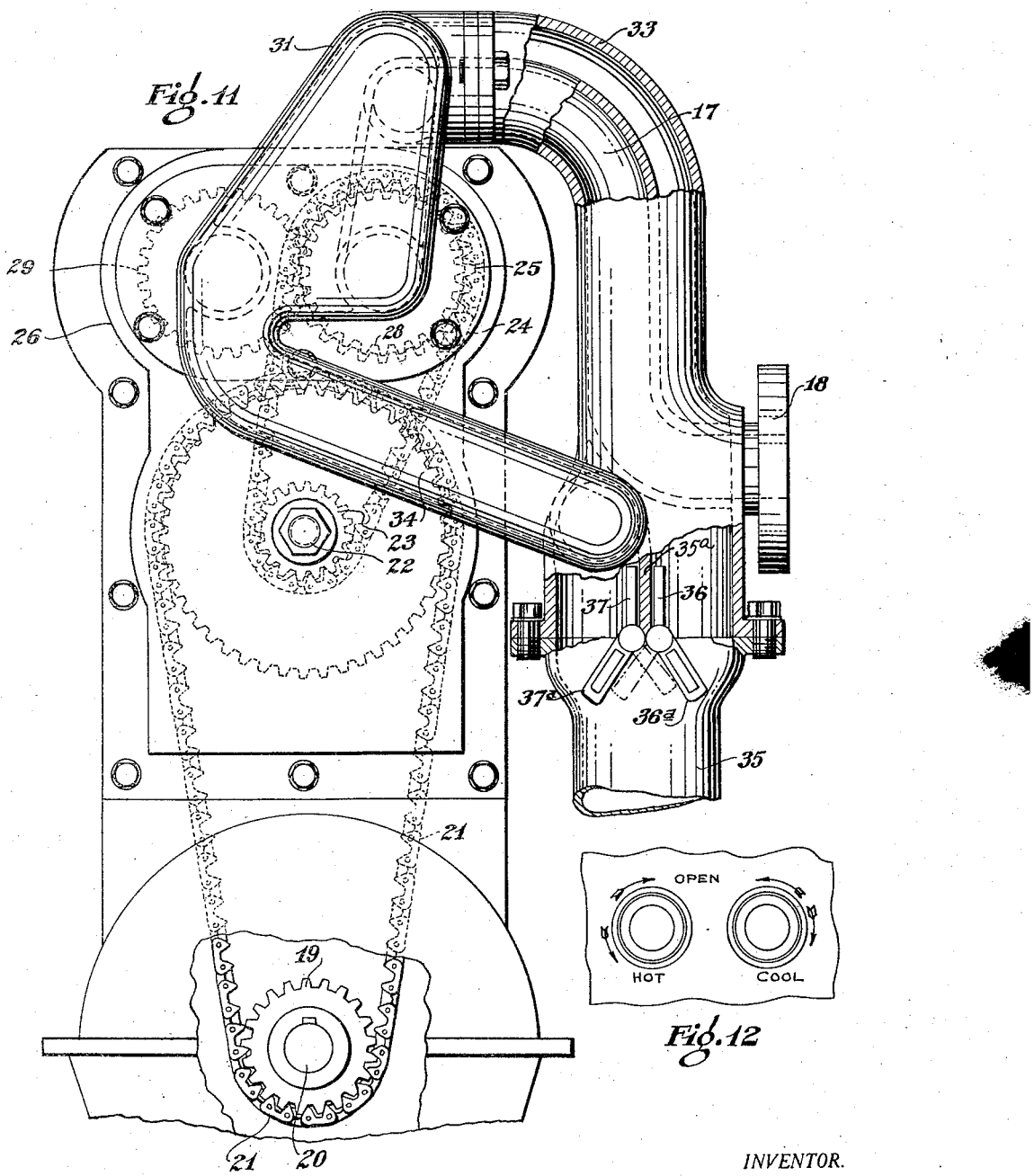

Patented Dec. 6, 1932

1,890,326

UNITED STATES PATENT OFFICE

SERN L. HANSEN, OF CLEVELAND, OHIO

VALVE STRUCTURE FOR GAS ENGINES

Application filed February 27, 1931. Serial No. 518,850.

This invention relates to an improved valve structure for internal combustion engines.

More specifically, this invention pertains to a rotatable hollow cylindrical form of valve, the object being to devise such a valve structure of comparatively simple and yet practical construction and operation so as to eliminate certain operating parts heretofore required in connection with the poppet valve and to eliminate also certain objectionable features incident thereto.

A further object consists in devising such a valve structure in which the force of the explosions within the combustion chamber is counterbalanced upon the two sides of the intake and exhaust valves so as to prevent any binding action of the valves as a result thereof.

Another object consists in devising such a valve structure in which there is provided a means within the exhaust valve for absorbing the heat of the exhaust so as to relieve the exhaust valve from detrimental effects to which it might otherwise be subjected.

Other objects will appear from the following description and claims when considered together with the accompanying drawings.

Fig. 1 is a vertical transverse sectional view of my improved construction; Fig. 2 is a sectional view taken on line 2—2 of Fig. 1; Fig. 3 is a partial plan view of the exhaust valve member; Fig. 4 is an end view thereof; Fig. 5 is a partial plan view of the intake valve member; Fig. 6 is an end view thereof; Fig. 7 is a plan view of the heat-absorbing medium; Fig. 8 is a view of one end thereof; Fig. 9 is a plan view of the flange member which is adapted to be attached to the other end of the heat-absorbing medium; Fig. 10 is a side elevation with parts broken away; Fig. 11 is an end view thereof; and Fig. 12 illustrates the hand-operated means upon the dash of the automobile for adjusting the positions of the exhaust control means.

It is to be understood that the present disclosure is merely for purposes of illustration and that other modifications and variations may be made without departing from the spirit of the present invention as herein set forth.

The explosion chamber 1, of which there may be adopted any number desired as in any other engine construction, has the piston 2 for operation in the usual manner. The explosion chambers throughout the whole extent of the engine block are surrounded by the water jacket 3 and the head of the engine block is surrounded also by the water jacket 4. As will be seen from the present disclosure, there is afforded maximum degree of space for the water chambers and as a result, the cooling efficiency of the engine is of a comparatively high degree. The head of the engine block is provided with oppositely disposed parallel valve casings of substantially cylindrical form which extend lengthwise of the engine, the walls of these valve casings being indicated by reference numeral 5 for the intake and 6 for the exhaust. Communication between the explosion chambers 1 and the inside of the valve casings 5 and 6 is afforded by means of the passages 7 and 8 which extend from the opposite upper ends of the explosion chamber in each case to diametrically opposite points at the sides of the valve casings 5 and 6. For this same purpose, there is provided also the middle passage 9 from the top of the explosion chamber 1, this passage extending laterally so as to communicate with both the intake and exhaust valve chambers, as clearly indicated by reference numerals 10 and 11 in Fig. 1. The openings of these passages at their upper ends are so arranged that they are diametrically disposed with relation to the passages 7 and 8, as clearly indicated in the drawings.

The spark plug 12 which is provided for each cylinder as in the usual manner, is positioned directly above the passage 9 and the timing of the sparking will be effected in the same manner with respect to the cycle of operations of the valves and pistons as in the well known operation of internal combustion engines.

The intake valve 13 consists of a hollow cylindrical metal member which is adapted for rotatable operation in snug engagement with its seat provided in the corresponding part of the valve casing 5. The valve member is provided with a plurality of pairs of diametrically disposed ports 14 so positioned as to register in proper timed operation with the diametrically disposed ends of the passages 7 and 10 so as to afford communication between the intake valve and the explosion chamber in each case. Thus, there is provided a pair of such ports 14 for each explosion chamber and the valve member 13 is rotated in proper timed relation with respect to the movements of the piston 2 so as to bring the different pairs of openings 14 into proper registry with the oppositely disposed passage openings 7 and 10.

As a means of supplying the combustible gas to the interior of the valve 13 and thence through the passages 7 and 10 to the combustion chamber 1, there are provided the vertically extending passages 15 through the top part of the casing head 4, the passages 15 all having communication through the corresponding openings or passages 16 with the intake manifold 17. Thus, the intake manifold 17 has means of direct communication with each of the explosion chambers 1 through the corresponding ports 14 in the valve for the purpose of supplying the combustible gas to the explosion chambers according to the properly timed operations of the engine. It will be observed that only one pair of ports 14 will be in open position at one time and that as each pair of ports 14 is in such position, one of the other valve ports will be in registry with the passages 15 and 16 so as to permit entrance of the gas to the interior of the valve member 13.

The intake manifold 17 extends longitudinally along the top of the casing head 4 to which it is suitably secured and is extended downwardly along the side of the engine, as clearly indicated in Figs. 10 and 11, the lower end of the manifold, as indicated in the present case, being provided with the annular flange 18 to which the carburetor may be connected.

The valve member 13 will be rotated continuously during operation of the engine by suitable operating connections from the crank shaft of the engine, as indicated in Fig. 11. The present form of operating connecting means comprises the sprocket 19 which is mounted upon the crank shaft 20 and which, through the chain connection 21, is adapted to drive the shaft 22 and the sprocket 23 carried thereupon. The sprocket chain 24 which is driven thereby is adapted in turn to rotate the sprocket 25 which is fixed upon the end of the hollow valve member 13 for rotation thereof. The extreme end portion of the valve member 13 has suitable bearing in the end casing member 26 which is suitably secured to the head of the engine block at the end thereof. Likewise, at its other end, the tubular valve member 13 will be suitably supported for rotatable movement within the end casing member 27 which is also suitably secured to the opposite end of the head of the engine block.

The hub of the sprocket 25 is provided also with the gear 28 which meshes with the gear 29 which is fixedly mounted upon the one end portion of the rotatable exhaust valve member 30 which operates within the casing 6. The valve member 30 is a substantial duplicate of the valve member 13 and is provided with the pairs of oppositely disposed ports 30$^a$ for communication therethrough for the purpose of discharging the exhaust gases through the passages 8 and 9 into and out through the valve 30. As above stated, the ports of the valve member 30 will be brought into registry with the passages 8 and 9 at properly timed intervals with respect to the other operations of the engine, as before explained. The extreme ends of the valve member 30 are suitably mounted for rotatable movement in the end casing members 26 and 27. From the two ends of the exhaust valve, there extend the arms 31 and 32 of the exhaust manifold which is extended both upwardly and downwardly. The upwardly extending portions surround the intake manifold 17 for the purpose of effecting a preliminary heating of the combustible gas prior to its admission to the combustion chamber. This jacket portion of the exhaust manifold is indicated by reference numeral 33 while the downwardly extending portion of the exhaust manifold is indicated by reference numeral 34. All of these several arms 33 and 34 of the exhaust manifold are combined together into the pipe 35 which extends to the point of actual discharge of the exhaust.

As a means of controlling the passage of the exhaust so as to divert a portion of the same through the jacket 33 and thereby heat the intake manifold 17, I have provided the valve members 36 and 37 which are pivoted in the unitary exhaust pipe 35 and which are so arranged that either one but only one of them can be closed at any given time. The valve members 36 and 37 are located below the points of entrance of the two exhaust branches, respectively, which are separated at this point by partition 35$^a$, and are provided with the lever arms 36$^a$ and 37$^a$ for the purpose of adjusting the same; and these arms which extend to the outside of the manifold 35, are each provided with a rod connection 38. As indicated in Fig. 11, the arms 36$^a$ and 37$^a$ are so positioned with respect to each other that in order to close one of them, it is necessary that the other be open. The ends of the levers 38 are located upon the dash of the automobile so as to be readily accessible for hand adjustment in the manner explained and as indicated in Fig. 12. These levers may be held in set position by friction or by means of a tension spring if so desired. In Fig. 11, the valves 36 and 37 are both open.

As a means of absorbing and carrying off the intense heat to which the exhaust valve member 30 would otherwise be subjected, I have positioned therewithin the stationary, longitudinally extending, tubular member of suitable material which for the most part is spaced from the valve member 30, as indicated in Fig. 1, but which in the regions upon the two sides of the diametrically disposed openings 40, contacts the inner surface of the valve member 30. The openings 40 are so positioned as to permit registry of the valve ports 30ª of the exhaust valve member therewith during exhaust of the gases from the explosion chamber 1. The spacing of the member 39 from the valve member 30 will prevent conduction of the heat, and furthermore, the space itself will serve as a heat-insulating medium for this purpose. At the same time, the contact between the restricted portions of the member 39 with the valve member 30 will prevent passage of the exhaust gases into the intermediate air space just referred to.

The heat-absorbing member 39 is also provided with a vertically disposed and diametrically extending baffle 41 which serves to still further absorb the heat of the exhaust gases by virtue of the increased exposed surface area and which also serves to intercept the full force and heat of the exhaust gases as they enter through the opposite ends of the passages 8 and 11.

The heat-absorbing member 39 is supported in fixed position at its two ends by means of the annular members 42 and 43 which are of polygonal form so as to maintain fixed position for the tubular member to which they are attached. The one member 42 is herein disclosed as being formed integrally with the end portion of the heat-absorbing member 39 and this annular member 42 is clamped in fixed position between the end casing member 31 and the casing member 26 to which the same is attached. The member 42 will seat in a correspondingly shaped space so as to prevent rotation or other movement thereof. The annular member 43 is seated in a similar manner between the end of the casing head and the casing member 27. The inner edge of the annular member 43 is of irregular form so as to prevent relative movement between such member and the heat-absorbing member to which it is attached.

In the present form of construction, the intake and exhaust valves are operated directly from the crank shaft with the elimination of certain of the operating parts which are now required in connection with the familiar form of poppet valve. Thus, with the present construction, there is eliminated the necessity of cam shaft, tappets, springs, and pins which are required in the other type of valve. Furthermore, the present form of valve is free of carbon and operates with considerably increased quietness. Also, the present valve construction ensures more nearly perfect seating which means greater power. The necessity of grinding the valves is entirely eliminated as well.

One of the principal advantages resulting from this invention resides in the fact that the exhaust gases are impinged with their impact upon diametrically opposite sides of the rotatable valve members which are therefore not subjected to any undue impact upon either side thereof, or at any point thereof. This means that these valves are free of any binding action with their valve casings as might otherwise occur. Thus, smooth and efficient operation of the rotatable valve members is insured throughout an indefinite period of time.

With the heat-absorbing means provided in the exhaust valve, this valve is relieved of the excessive degree of heat to which it would otherwise be subjected and which would otherwise result in undue consumption of the lubricating means between the valve and its casing seat. Thus, there is insured increased life of the parts as well as improved manner of operation.

The baffle 41 serves also as a means of reinforcing the heat-absorbing member 39 and is here shown as being formed integrally therewith and hence of the same metal or other material which may be selected for this member. For instance, sheet or cast metal may be employed.

With the present construction, the crank shaft and valves will be rotated at a ratio of four to one; that is, the valves will rotate only one-fourth as fast as the crank shaft. This comparatively slow speed of the valve rotation means less power for producing such rotation and also less wear between the parts. Hence this feature also contributes to the efficiency and long life of the engine.

Other advantages will suggest themselves to those who are skilled in the art.

Any and all modifications are intended to be comprehended by the following claims which are therefore not to be construed in a limited sense.

What I claim is:

1. In an internal combustion engine, the combination of a piston chamber, separate intake and exhaust valves therefor, each of said valves comprising a cylindrical casing having diametrically disposed port openings therethrough and communicating with said chamber, and comprising also a rotatable, hollow, cylindrical valve member within said casing and having diametrically disposed openings therethrough for registry with said port openings, means of communication between the inside of each of said valve members and the outside of said casing for intake and exhaust, and means for rotating said valve members in properly timed sequence, said valves being so constructed and operated that the impact of the explosions individually upon the valves will be counter-balanced upon diametrically opposite sides of each of said valves.

2. In an internal combustion engine, the combination of a block having a plurality of piston chambers, intake and exhaust valves for each of the chambers, each valve having a cylindrical casing in said block, and a rotatable, hollow, cylindrical valve member in said casing, each of said chambers having ports affording communication between the same and the outer sides of the intake and exhaust valve casings and having also an intermediate port affording communication between the same and the inner sides of the intake and exhaust valve casings at points diametrically disposed with respect to said first-mentioned ports, intake and exhaust means of communication with the intake and exhaust valves respectively, said valve member in each case having diametrically disposed parts for each chamber, and means for operating said valve members so as to successively bring into registry the valve ports with said diametrically disposed ports, the ports of each of said valve members being equispaced thereabout, and said valves being so constructed and operated that while one valve is open, communication will be afforded for the same valve through its intake or exhaust port by the simultaneous registry therewith of a port of another of said valves, said valve members consisting of a single rotatable member for each set of intake and exhaust valves respectively, each of said valve members having a pair of diametrically disposed openings therethrough for registry with each set of port openings, said valves being so constructed and operated that the impact of the explosions upon the valves will be counter-balanced upon diametrically opposite sides of each of said valves.

3. In an internal combustion engine, the combination of a piston chamber, intake and exhaust valves therefor, each of said valves respectively comprising a cylindrical casing having diametrically disposed port openings therethrough and communicating with said chamber, and a rotatable, hollow, cylindrical valve member within said casing and having diametrically disposed openings therethrough for registry with said port openings, means of communication between the inside of each of said valve members and the outside of said casing for intake and exhaust, means for rotating said valve members, said valves being so constructed and operated that the impact of the explosions upon the valves will be counter-balanced upon diametrically opposite sides of each of said valves, and heat-absorbing means within the rotatable exhaust valve member.

4. In an internal combustion engine, the combination of a piston chamber, intake and exhaust valves therefor, each of said valves respectively comprising a cylindrical casing having diametrically disposed port openings therethrough and communicating with said chamber, and a rotatable, hollow, cylindrical valve member within said casing and having diametrically disposed openings therethrough for registry with said port openings, means of communication between the inside of each of said valve members and the outside of said casing for intake and exhaust, means for rotating said valve members, said valves being so constructed and operated that the impact of the explosions upon the valves will be counter-balanced upon diametrically opposite sides of each of said valves, and heat-absorbing means located within the rotatable exhaust valve member and in the path of the exhaust from said port openings.

5. In an internal combustion engine, the combination of a piston chamber, intake and exhaust valves therefor, each of said valves respectively comprising a cylindrical casing having diametrically disposed port openings therethrough and communicating with said chamber, and a rotatable, hollow, cylindrical valve member within said casing and having diametrically disposed openings therethrough for registry with said port openings, means of communication between the inside of each of said valve members and the outside of said casing for intake and exhaust, means for rotating said valve members, said valves being so constructed and operated that the impact of the explosions upon the valves will be counter-balanced upon diametrically opposite sides of each of said valves, and heat-absorbing means located within the rotatable exhaust valve member and extending about the inner surface thereof.

6. In an internal combustion engine, the combination of a piston chamber, intake and exhaust valves therefor, each of said valves respectively comprising a cylindrical casing having diametrically disposed port openings therethrough and communicating with said chamber, and a rotatable, hollow, cylindrical valve member within said casing and having diametrically disposed openings therethrough for registry with said port openings, means of communication between the inside of each of said valve members and the outside of said casing for intake and exhaust, means for rotating said valve members, said valves being so constructed and operated that the impact of the explosions upon the valves will be counter-balanced upon diametrically opposite sides of each of said valves, and heat-absorbing means located within the rotatable exhaust valve member and comprising a fixed tubular member having oppositely disposed openings in registry with the said port openings and having a baffle means extending diametrically thereacross in the path of the exhaust as it enters through said port openings.

7. In an internal combustion engine, the combination of a piston chamber, intake and exhaust valves therefor, each of said valves respectively comprising a cylindrical casing having diametrically disposed port openings therethrough and communicating with said chamber, and a rotatable, hollow, cylindrical valve member within said casing and having diametrically disposed openings therethrough for registry with said port openings, means of communication between the inside of each of said valve members and the outside of said casing for intake and exhaust, means for rotating said valve members, said valves being so constructed and operated that the impact of the explosions upon the valves will be counter-balanced upon diametrically opposite sides of each of said valves, and heat-absorbing means within the rotatable exhaust valve member and spaced therefrom.

In witness whereof I hereby affix my signature.

SERN L. HANSEN.